US012083674B2

(12) United States Patent
Shelley et al.

(10) Patent No.: US 12,083,674 B2
(45) Date of Patent: Sep. 10, 2024

(54) PRELOADED STRUT

(71) Applicant: Etegent Technologies LTD., Cincinnati, OH (US)

(72) Inventors: Stuart J. Shelley, Cincinnati, OH (US); Richard Allan Roth, II, Goshen, OH (US); Kevin Joseph Sigmund, Newtown, OH (US)

(73) Assignee: Etegent Technologies, Ltd., Cincinnati, OH (US)

( * ) Notice: Subject to any disclaimer, the term of this patent is extended or adjusted under 35 U.S.C. 154(b) by 637 days.

(21) Appl. No.: 17/298,843

(22) PCT Filed: Dec. 12, 2019

(86) PCT No.: PCT/US2019/065997
§ 371 (c)(1),
(2) Date: Jun. 1, 2021

(87) PCT Pub. No.: WO2020/123818
PCT Pub. Date: Jun. 18, 2020

(65) Prior Publication Data
US 2022/0032481 A1 Feb. 3, 2022

Related U.S. Application Data

(60) Provisional application No. 62/779,241, filed on Dec. 13, 2018.

(51) Int. Cl.
*B25J 19/00* (2006.01)
*B25J 17/02* (2006.01)
(Continued)

(52) U.S. Cl.
CPC ....... *B25J 19/0091* (2013.01); *B25J 17/0216* (2013.01); *F16F 1/366* (2013.01);
(Continued)

(58) Field of Classification Search
CPC .... B25J 19/0091; B25J 17/0216; F16F 1/366; F16F 1/44; F16F 2224/0241; F16F 2224/025; F16F 2228/08; F16F 2230/08; F16F 2230/183; F16F 2236/04; F16F 9/44; F16F 9/3405; F16F 9/5126; F16F 9/34; B25C 1/042; B60G 17/04
See application file for complete search history.

(56) References Cited

U.S. PATENT DOCUMENTS 2,509,100 A * 5/1950 Jordan ................... H02G 1/083
254/134.3 FT
2,509,115 A * 5/1950 Wait ....................... H02G 1/083
254/134.3 FT
(Continued)

OTHER PUBLICATIONS

International Search Report and Written Opinion issued in PCT Application No. PCT/US2019/065997, dated Mar. 2, 2020, 26 pages.

*Primary Examiner* — Bradley T King
*Assistant Examiner* — James K Hsiao
(74) *Attorney, Agent, or Firm* — Gray Ice Higdon

(57) ABSTRACT

A strut suitable for use in parallel manipulator and other applications utilizes an actuation member that is subjected to a quasi-static axial tensioning force to effectively preload the strut to provide axial stiffness and bending flexibility at one or more ends of the strut.

26 Claims, 5 Drawing Sheets

(51) Int. Cl.
  *F16F 1/366* (2006.01)
  *F16F 1/44* (2006.01)
(52) U.S. Cl.
  CPC ........ *F16F 1/44* (2013.01); *F16F 2224/0241* (2013.01); *F16F 2224/025* (2013.01); *F16F 2228/08* (2013.01); *F16F 2230/0005* (2013.01); *F16F 2236/04* (2013.01)

(56) References Cited

U.S. PATENT DOCUMENTS

| | | | |
|---|---|---|---|
| 2,530,964 A * | 11/1950 | Hirsch | A44C 5/14 |
| | | | 63/5.2 |
| 2,559,160 A * | 7/1951 | Jacob | H02G 1/085 |
| | | | 254/134.3 FT |
| 2,709,079 A * | 5/1955 | Bubb | A63G 11/00 |
| | | | 446/486 |
| 2,880,435 A * | 4/1959 | Deutsch | E03F 9/002 |
| | | | 403/349 |
| 3,243,149 A * | 3/1966 | Burns | B64G 1/62 |
| | | | 244/100 R |
| 3,258,219 A | 6/1966 | Thomas | |
| 3,343,231 A | 9/1967 | Clay | |
| 3,397,420 A * | 8/1968 | Schneider | E03F 9/002 |
| | | | 403/291 |
| 3,853,199 A * | 12/1974 | Hirashima | B60R 21/013 |
| | | | 180/274 |
| 3,864,049 A * | 2/1975 | Ono | E02B 3/06 |
| | | | 403/171 |
| 3,918,196 A * | 11/1975 | Schleich | A63H 33/04 |
| | | | 446/107 |
| 4,731,962 A | 3/1988 | Kittner et al. | |
| 4,889,320 A | 12/1989 | Pasbrig | |
| 5,098,493 A | 3/1992 | Taylor | |
| 5,120,032 A | 6/1992 | Smith | |
| 5,158,162 A | 10/1992 | Fink et al. | |
| 5,377,556 A | 1/1995 | Byrnes | |
| 5,667,326 A * | 9/1997 | McGaffigan | A63H 33/042 |
| | | | 403/348 |
| 5,913,944 A | 6/1999 | Haynes et al. | |
| 6,205,944 B1 | 3/2001 | Dierksen et al. | |
| 6,328,294 B1 | 12/2001 | Palinkas | |
| 6,441,801 B1 | 8/2002 | Knight et al. | |
| 6,475,117 B1 * | 11/2002 | Berglund | A63H 33/101 |
| | | | 403/171 |
| 6,672,789 B2 * | 1/2004 | Chen | F16B 7/185 |
| | | | 403/171 |
| 7,597,953 B2 | 10/2009 | Filsinger et al. | |
| 7,640,825 B2 | 1/2010 | Basile et al. | |
| 7,811,309 B2 * | 10/2010 | Timm | A61B 17/7007 |
| | | | 606/255 |
| 8,708,280 B2 | 4/2014 | Blanchard et al. | |
| 8,960,600 B2 | 2/2015 | Carreker | |
| 9,080,339 B2 | 7/2015 | Hayes | |
| 9,289,238 B2 | 3/2016 | Ross et al. | |
| 9,450,333 B2 | 9/2016 | Hanson et al. | |
| 9,618,069 B2 | 4/2017 | Destories et al. | |
| 9,632,282 B2 | 4/2017 | Van Lue et al. | |
| 9,732,820 B2 | 8/2017 | Billiot et al. | |
| 9,797,467 B2 * | 10/2017 | Wootten | B60G 17/0416 |
| 9,835,217 B2 | 12/2017 | Nakamura et al. | |
| 2009/0148289 A1 * | 6/2009 | Edenfeld | F03D 80/00 |
| | | | 416/145 |
| 2014/0223967 A1 | 8/2014 | Prouvost et al. | |
| 2017/0221376 A1 | 8/2017 | Gosselin | |
| 2018/0323489 A1 * | 11/2018 | Vermillion, Jr. | H01Q 1/281 |

* cited by examiner

PRELOADED STRUT

GOVERNMENT RIGHTS

Certain aspects of this invention were made with government support under Grant/Contract No. FA8651-17-C-0067 awarded by the Air Force Research Laboratory Munitions Directorate (AFRL/RWK). The U.S. Government may have certain rights in the invention.

BACKGROUND OF THE INVENTION

A strut is a structural component used in a number of different applications and industries to resist longitudinal or axial compression and/or tension. In some instances, struts are subjected purely to longitudinal or axial forces. In other instances, however, struts may additionally be subject to forces in other directions.

For example, struts may be used in multi-axis motion simulators or motion control systems to couple a movable platform to a fixed base. Parallel manipulators such as hexapods or Stewart platforms are used for some motion simulation applications, and include six mechanical supports, with each mechanical support including a strut in series with a linear actuator that varies the effective length of the mechanical support. Through the coordinated control over the six linear actuators, the platform is said to have six degrees of freedom, including movement in three linear directions (x, y, z or lateral, longitudinal and vertical) as well as in three rotational directions (pitch, roll, & yaw).

A challenge of such applications is that each mechanical support between the movable platform and the fixed base or between the movable platform and an actuator generally must be axially stiff (i.e., not stretch or compress meaningfully in an actuation direction) to enable an actuation force to be controllably applied to the platform. At the same time, each mechanical support generally must also accommodate cross-axis motion (i.e., translational motion perpendicular to the axis of the support) and angular motion of the platform. Both cross-axis motion and angular motion generally require that the mechanical support be able to bend at each end, and to do so without damaging itself (e.g., through cracking, developing looseness, breaking, becoming axially flexible, etc.) and without applying large torques or cross-axis forces to the platform being actuated or to the actuator.

These challenges are magnified in precision applications requiring high accuracy, resolution and repeatability, as any looseness or backlash, or any bending modes that allow energy to be transferred without observation by sensors or uncontrollable by actuators, can reduce precision. Conventional mechanical supports for such applications utilize end structures such as uni-balls, ball bearings, and other mechanical flexures, yet these structures can add greater than desired mass (decreasing the axial resonant frequency of a support, decreasing the bending resonance of the support, and decreasing the control force available to actuate the platform) and can be subject to wear and failure over time.

Accordingly, a need continues to exist for a strut capable of being used in a mechanical support for a parallel manipulator, among other applications, and having high axial stiffness while accommodating cross-axis and angular motion, as well as having resistance to wear over time.

SUMMARY OF THE INVENTION

Embodiments consistent with the invention are directed to a strut suitable for use in parallel manipulator and other applications in which an actuation member is subjected to a quasi-static axial tensioning force to effectively preload the strut to provide axial stiffness and bending flexibility at one or more ends of the strut.

Therefore, consistent with one aspect of the invention, a strut may include a rigid tensioning member, a compression spring disposed proximate a first end of the rigid tensioning member, and an actuation member extending through the rigid tensioning member and the compression spring, the actuation member being substantially axially rigid under tension and at least a portion of the actuation member extending through the compression spring being substantially flexible in bending or compression, where the actuation member is preloaded through the compression spring and the rigid tensioning member with a quasi-static axial tensioning force such that the actuation member remains substantially axially rigid in response to application of an axial compressive force to the strut that is less than the quasi-static tensioning force.

Some embodiments may also include a tensioner coupled to a first end of the actuation member proximate the compression spring to apply the quasi-static tensioning force to the actuation member. Also, in some embodiments, the first end of the actuation member is threaded, and the tensioner includes a nut that is threadably engaged with the first end of the actuation member.

Further, in some embodiments, the rigid tensioning member includes a rigid tensioning tube. In some embodiments, the rigid tensioning tube includes a carbon fiber tube. In addition, in some embodiments, the compression spring includes an elastomeric spring. In some embodiments, the compression spring includes a coiled spring. In addition, in some embodiments, the compression spring includes a conical spring washer.

Moreover, in some embodiments, the actuation member includes a braided metal cable included of a plurality of strands. In some embodiments, the portion of the actuation member includes a first portion of the actuation member that is flexible in bending or compression, and the actuation member further includes a second, rigid portion that is less flexible than the first portion of the actuation member. Some embodiments may also include a strut mount configured to mount the strut to an external member, where the actuation member is secured to the strut mount with the compression spring substantially interposed between the strut mount and the rigid tensioning member. Moreover, in some embodiments, the strut mount includes an axial channel, and the actuation member projects through the axial channel of the strut mount.

In some embodiments, the actuation member is preloaded during manufacture. In addition, in some embodiments, the actuation member is preloaded during installation.

Consistent with another aspect of the invention, a strut may include a rigid tensioning member, a first and second compression springs respectively disposed proximate first and second ends of the rigid tensioning member, and an actuation member extending through the rigid tensioning member and the first and second compression springs, the actuation member being substantially axially rigid under tension and at least first and second portions of the actuation member extending respectively through the first and second compression springs being substantially flexible in bending or compression, where the actuation member is preloaded through the first and second compression springs and the rigid tensioning member with a quasi-static axial tensioning force such that the actuation member remains substantially axially rigid in response to application of an axial compressive force to the strut that is less than the quasi-static tensioning force.

Consistent with another aspect of the invention, a strut may include a strut mount, a rigid tensioning tube having a first end, a compression spring disposed intermediate the strut mount and the rigid tensioning tube, a flexible braided metal cable having a threaded end and extending through the rigid tensioning tube and through each of the compression spring and the strut mount, and a fastener secured to the threaded end of the flexible braided metal cable and tensioned to apply a quasi-static tensioning force to the flexible braided metal cable through the rigid tensioning tube, the compression spring and the strut mount such that the flexible braided metal cable remains substantially axially rigid in response to application of an axial compressive force to the strut that is less than the quasi-static tensioning force.

Consistent with another aspect of the invention, a strut may include first and second strut mounts, a rigid tensioning tube disposed intermediate the first and second strut mounts and having first and second ends respectively disposed proximate the first and second strut mounts, first and second compression springs respectively disposed intermediate the first and second strut mounts and the rigid tensioning tube, a flexible braided metal cable having first and second threaded ends and extending through the rigid tensioning tube and through each of the first and second compression springs and the first and second strut mounts, and first and second fasteners respectively secured to the first and second threaded ends of the flexible braided metal cable and tensioned to apply a quasi-static tensioning force to the flexible braided metal cable through the rigid tensioning tube, the first and second compression springs and the first and second strut mounts such that the flexible braided metal cable remains substantially axially rigid in response to application of an axial compressive force to the strut that is less than the quasi-static tensioning force.

Consistent with another aspect of the invention, a parallel manipulator may include a base, a platform, and a plurality of platform supports supporting the platform on the base for movement of the platform with multiple degrees of freedom. Each of the plurality of platform supports includes a linear actuator and a strut coupling the platform to the base, each strut including a rigid tensioning member, a compression spring disposed proximate a first end of the rigid tensioning member, and an actuation member extending through the rigid tensioning member and the compression spring, the actuation member being substantially axially rigid under tension and at least a portion of the actuation member extending through the compression spring being substantially flexible in bending or compression, where the actuation member is preloaded through the compression spring and the rigid tensioning member with a quasi-static axial tensioning force such that the actuation member remains substantially axially rigid in response to application of an axial compressive force to the strut that is less than the quasi-static tensioning force.

Some embodiments may also include an additional strut anchoring the platform to the base to restrict motion of the platform in at least one degree of freedom, the additional strut including a rigid tensioning member, a compression spring disposed proximate a first end of the rigid tensioning member, and an actuation member extending through the rigid tensioning member and the compression spring, the actuation member being substantially axially rigid under tension and at least a portion of the actuation member extending through the compression spring being substantially flexible, where the actuation member is preloaded through the compression spring and the rigid tensioning member with a quasi-static axial tensioning force such that the actuation member remains substantially axially rigid in response to application of an axial compressive force to the strut that is less than the quasi-static tensioning force.

Consistent with another aspect of the invention, a parallel manipulator may include a base, a platform, a plurality of platform supports supporting the platform on the base for movement of the platform with multiple degrees of freedom, each of the plurality of platform supports including a linear actuator, and one or more struts anchoring the platform to the base to restrict motion of the platform in at least one degree of freedom. Each strut includes a rigid tensioning member, a compression spring disposed proximate a first end of the rigid tensioning member, and an actuation member extending through the rigid tensioning member and the compression spring, the actuation member being substantially axially rigid under tension and at least a portion of the actuation member extending through the compression spring being substantially flexible in bending or compression, where the actuation member is preloaded through the compression spring and the rigid tensioning member with a quasi-static axial tensioning force such that the actuation member remains substantially axially rigid in response to application of an axial compressive force to the strut that is less than the quasi-static tensioning force.

Consistent with another aspect of the invention, a strut may include a strut mount, a rigid tensioning member, a compression spring disposed intermediate the strut mount and the rigid tensioning member, and an actuation member extending in parallel with the compression spring between the strut mount and the rigid tensioning member, the actuation member being substantially axially rigid under tension and at least a portion of the actuation member that extends between the strut mount and the rigid tensioning member being substantially flexible in bending or compression, where the actuation member is preloaded across the compression spring and between the strut mount and the rigid tensioning member with a quasi-static axial tensioning force such that the actuation member remains substantially axially rigid in response to application of an axial compressive force to the strut that is less than the quasi-static tensioning force.

Moreover, in some embodiments, the rigid tensioning member is a rigid portion of the actuation member. Also, in some embodiments, the rigid tensioning member further includes a mating surface that mates with a complementary mating surface of the compression spring. In some embodiments, at least a portion of the actuation member extends through the rigid tensioning member. In addition, in some embodiments, at least a portion of the actuation member extends through the compression spring.

Consistent with another aspect of the invention, a strut may include a strut mount, an actuation member including flexible and rigid portions, and a compression spring disposed intermediate the strut mount and the rigid portion of the actuation member. The flexible portion of the actuation member extends between the rigid portion of the actuation member and the strut mount, and the flexible portion is substantially axially rigid under tension and substantially flexible in bending or compression. Moreover, the flexible portion of the actuation member is preloaded through the compression spring with a quasi-static axial tensioning force such that the flexible portion of the actuation member remains substantially axially rigid in response to application of an axial compressive force to the strut that is less than the quasi-static tensioning force.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments of the invention are generally directed to various improvements related to structural supports such as struts, particularly for use in applications where the structural supports are subjected to cross-axis forces and that can accommodate some degree of bending while retaining axial stiffness.

Figure 1:
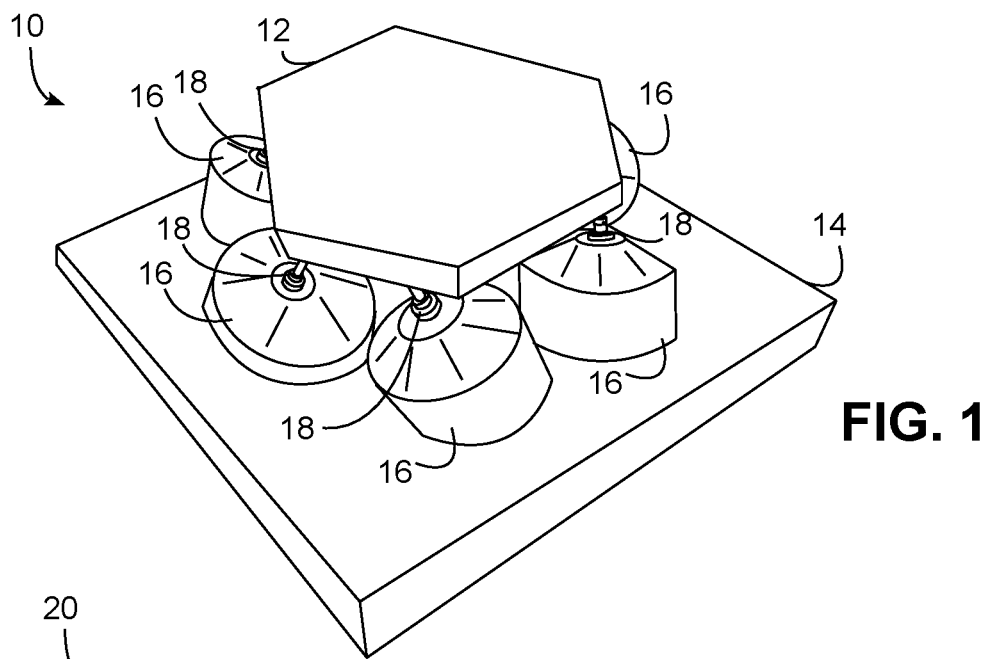
FIG. 1 is an illustration of a parallel manipulator utilizing a plurality of preloaded struts consistent with some embodiments of the invention.

One such type of application relates to multi-axis motion actuation and/or control, e.g., utilizing a parallel manipulator such as a hexapod or Stewart platform. FIG. 1, for example, functionally illustrates a typical design of a hexapod 10, in which a motion platform 12 is supported on a fixed base 14 using a plurality (e.g., six) supports, each of which including a linear actuator 16 and strut 18. Through the coordinated actuation of each linear actuator 16, six degrees of freedom are provided for motion platform 12, including movement in three linear directions (x, y, z or lateral, longitudinal and vertical) as well as in three rotational directions (pitch, roll, & yaw).

Hexapod 10 incorporates linear actuators 16 having fixed stators and movable actuator armatures that are coupled to motion platform 12 through struts 18, such that the stators do not move with the motion of motion platform 12. An advantage of such an arrangement is that the mass of the stators does not affect the motion of the motion platform, which reduces the loads on the mechanical components coupled to the motion platform, as well as simplifies the control aspects of the design. In other designs, however, both the actuator stators and armatures may move with the motion of motion platform 12, and as such, struts may be used to couple each linear actuator to motion platform 12, to base 14, or to both. In still other designs, flexible couplings such as ball joints or universal joints may be used to couple each linear actuator to motion platform 12, to base 14, or to both.

It will be appreciated that each linear actuator 16 may be mechanical, hydraulic, pneumatic, electrical, electromagnetic or electromechanical in design, and may additionally include a position sensor to provide feedback of the position and thereby enable precise control over the effective length of the actuator, and thus the orientation and position of the motion platform 12. Moreover, rather than supporting motion platform 12 on top of base 14, motion platform 12 and base 14 may have other orientations, including an orientation where motion platform 12 hangs below base 14.

Hexapod 10 may be utilized in a number of different applications, e.g., for motion simulation and/or control, mechanical testing, vibration testing, vehicle simulation, robotics, robotic surgery, machine tools, satellite dish positioners, and telescopes, among other applications. In many of these applications, the coupled structural dynamics of the motion platform, actuators, actuator couplings and support structure; the coupled non-ideal and non-linear physics and dynamics of the components; where electromagnetic linear actuators are used, the electromagnetic characteristics of the actuators, power amplifier dynamics, ripple, noise, peak current/voltage and power-supply energy storage/feed capability; the system geometric configuration; the motion sensing system characteristics, including native mode (displacement, velocity, acceleration, relative or absolute, etc.), resolution, dynamic range, nonlinearity, bandwidth and noise; the sample rate, input and output analog filter/circuit characteristics, ADC/DAC resolution and noise of the control electronics, etc. can all have a significant impact on performance.

This is particularly true as the desired control bandwidth increases, as structural dynamics become more and more of an anathema as control bandwidth increases, often becoming a primary factor responsible for both performance deficiencies and failure of mechanical components. It becomes more difficult to achieve designs that are sufficiently rigid and low mass to keep structural resonances above the control bandwidth. Structural resonances of the motion platform, axial and cross-axis resonances of the actuator/strut assemblies, and even resonances of the system support structure can corrupt control performance and cause high stresses on mechanical components and connections, potentially leading to wear and failure. Exacerbating the structural dynamics challenges, at higher frequencies the phase lags, dynamics and noise associated with digital control systems (e.g., sample and hold delay, computation time, etc.), signal conditioning, sensor systems, power amplifiers and actuation systems all become more significant challenges to deal with. Both phase lag and noise increase with bandwidth.

One important concern is actuation load path stiffness, as actuation of a linear actuator accelerates an armature to either compress or stretch the components connecting the actuator to the motion platform and thereby cause an acceleration force to be applied to the motion platform. Further, as the armature mass increases, the resonance of the system decreases, and in some instances, can intrude upon the control bandwidth and thereby limit the achievable closed loop gain and reducing performance.

Another concern is motion platform dynamics. During the design of motion control systems, much effort is devoted to keeping the resonant frequencies of the motion platform above the frequency bandwidth of interest. This design effort, however, cannot focus on the motion platform in isolation from the coupled effects of both the axial and cross-axis dynamics of the actuation system, i.e., the moving actuator mass and the actuator/platform connection. The parasitic mass and structural dynamics of the multi-degree-of-freedom (MDOF) actuation system can significantly change the free-free dynamics of the motion platform. In designs where both the actuator armature and stator pivot with the motion of the motion platform, the entire mass of the armature is highly coupled to the in-plane motion of the motion platform. Due to the high actuator mass and inherent flexibility of actuation systems in the cross-axis direction it is likely the cross-axis resonant frequencies of the actuators are very low, which would significantly complicate the control aspects of the design. Not only is control performance affected by this design but the pivoting or flexible connections between the motion platform and actuators would experience very high loads causing concern regarding wear and failure.

In the design of FIG. 1, which utilizes actuation struts with pivoting end connections to couple the actuator armature to the motion platform and apply actuator force, only the actuator armature mass and strut mass are coupled axially to the motion platform, and only a portion of the strut mass is coupled cross-axially. This design introduces fewer parasitic dynamics into the actuated section and thus may be preferable for high frequency applications.

Figure 2:
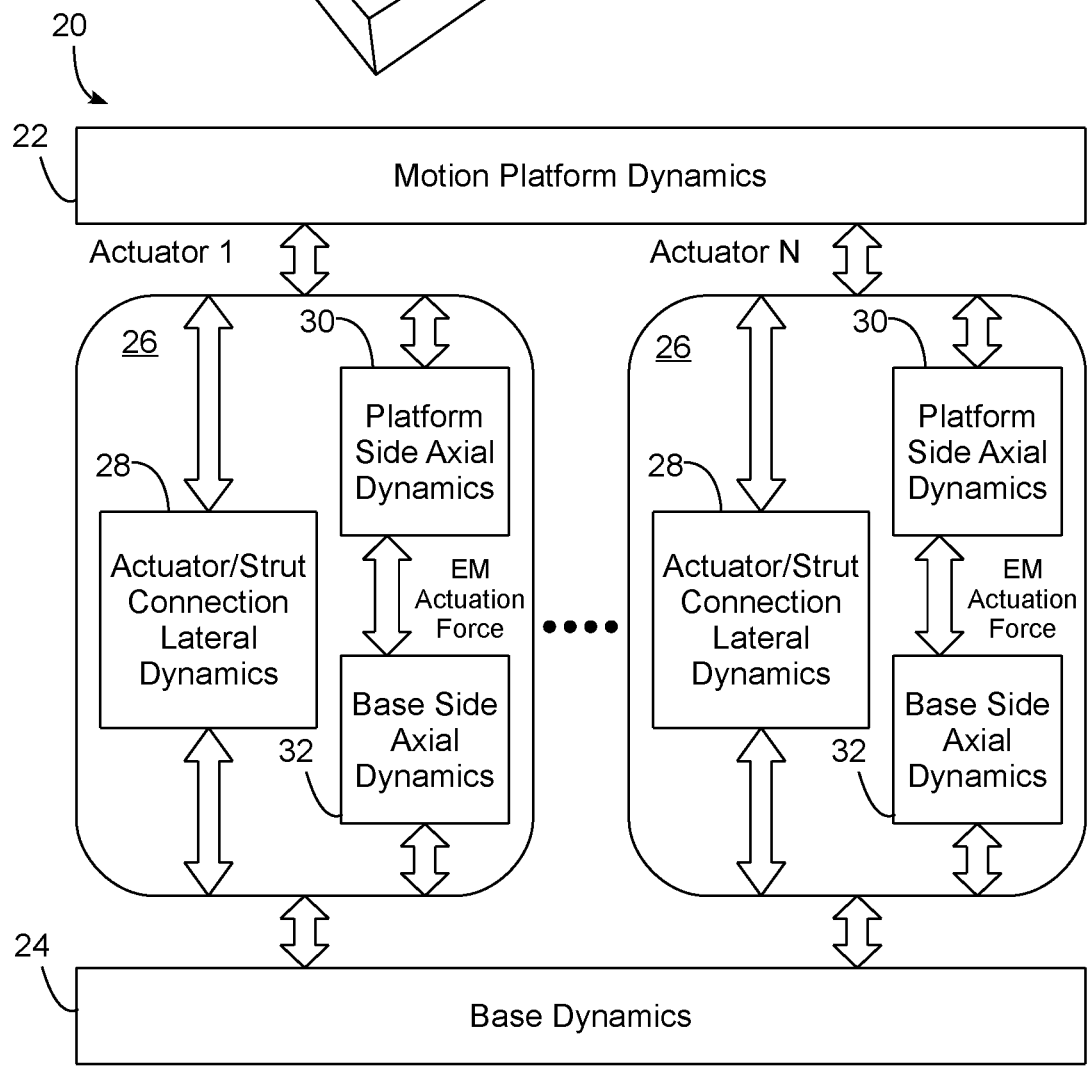
FIG. 2 is a block diagram illustrating the complex dynamics of the parallel manipulator of FIG. 1.

FIG. 2 illustrates more broadly the complex dynamics of a MDOF motion simulation system 20. In addition to motion platform dynamics 22 and base dynamics 24, which have generally linear structural dynamic characteristics (resonant frequencies, mode shapes, etc.), various actuator and connection dynamics are also present. Each actuator 26 couples the base and platform dynamics 24, 22 through cross-axis dynamic characteristics, including actuator/strut connection lateral dynamics 28. The electromagnetic (EM) force generated in an electromagnetic actuator also acts through the axial dynamics of the moving and stationary sides of the actuator (represented by platform side axial dynamics 30 and base side axial dynamics 32). In addition, for motion simulation applications, these dynamics are a function, to some degree, of both position and velocity (i.e., Coriolis terms enter into the dynamics).

As such, the total system dynamics can present an extremely complex, nonlinear, coupled, and state-dependent dynamic system. As such, anything that can be done in the system configuration choice to mitigate these challenges may enable improved design, modeling, simulation, and thus ultimately performance.

Embodiments consistent with the invention mitigate some of these challenges through the use of a strut having an actuation member that is stiff in tension, is flexible in bending, and yet has low compressional axial stiffness, coupled with a tension preload of the actuation member through preloaded compression springs that are also flexible in both the bending and axial directions. The tension preload, which is also referred to herein as a quasi-static axial tensioning force, is selected to be larger than any expected compressional actuation force such that the preloaded actuation member is also effectively axially stiff in compression in use. This combination of elements provides a strut that is axially stiff (i.e., does not stretch or compress meaningfully in the actuation direction due to an applied actuation force) while simultaneously being able to accommodate cross-axis motion of a connected object (i.e., translational motion perpendicular to the axis of the strut) and angular motion of the connected object, additionally without damaging itself (e.g., by cracking, developing looseness, breaking, becoming axially flexible, etc.) and without applying large torques or cross-axis forces to the connected object. Desirably, the combination of elements also provides bending flexibility at one or both ends without compromising long term reliability, axial stiffness, axial strength or linearity (e.g., as might occur as a result of looseness developed over time).

An actuation member consistent with the invention is desirably both axially stiff (in tension) and flexible in bending and/or compression, at least in a portion thereof. One example implementation of an actuation member is an elongated member such as a wire, rope or cable, e.g., formed of metal or another material with relatively high tensile strength. In addition, in some instances an actuation member may be formed of multiple elongated members, e.g., multiple wires or strands that may be aligned in parallel or at angles to each other or that may be braided, twisted, woven, or otherwise grouped together, etc. In one example embodiment, for instance, the actuation member may be a flexible braided metal cable including multiple strands. It will be appreciated that the axial stiffness and strength of a collection of circular wires is generally dependent on the sum of the cross-sectional areas of the wires, so a collection of circular wires will generally have a comparable axial stiffness and strength to that of a single rod having the same cross-sectional area. On the other hand, the bending stiffness of each wire in a collection of wires is proportional to the bending moment of inertia ($I=(\pi*d^4)/64$), which is proportional to the diameter to the 4th power. As such, a number of small diameter wires, rods or other types of elongated members can achieve generally the same axial stiffness as one larger diameter elongated member, but with a fraction of the bending stiffness. On the other hand, the actuation member, absent preloading, is not required to be axially stiff in compression.

Other embodiments may utilize other actuation members, e.g., bundles of one or more members composed of carbon fiber, Kevlar or other high tensile strength, high stiffness materials, combinations of different materials, etc. These members may be round in cross-section in some embodiments, or may have other cross-sectional profiles tailored to specific applications in other embodiments. Therefore, the invention is not limited to the specific implementations discussed herein.

Figure 3:
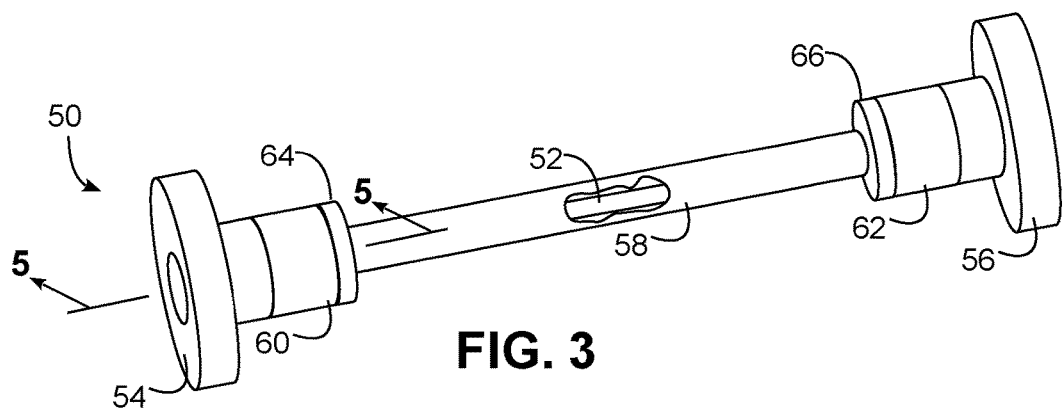
FIG. 3 is a perspective view of a preloaded strut consistent with some embodiments of the invention.
Figure 4:
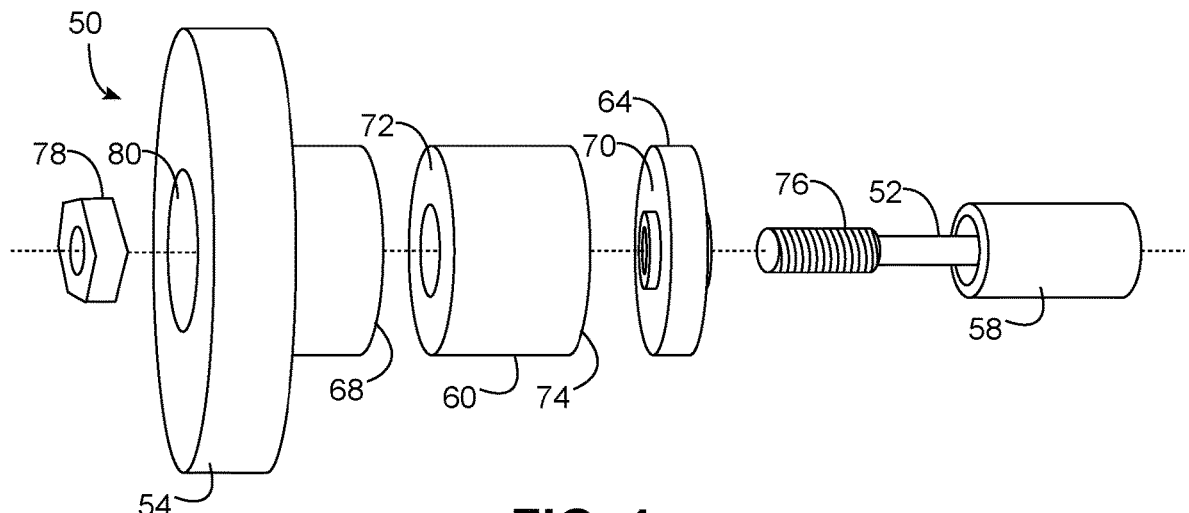
FIG. 4 is an exploded perspective view of one end of the preloaded strut of FIG. 3.
Figure 5:
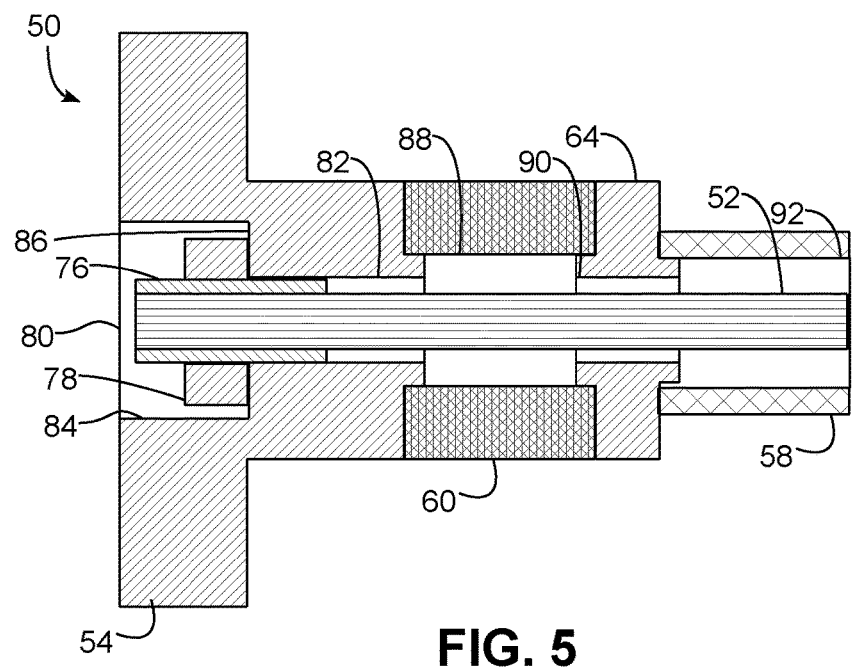
FIG. 5 is a cross-sectional view of one end of the preloaded strut of FIG. 3, taken along lines 5-5 thereof.

The lack of stiffness in compression of an actuation member is addressed in the illustrated embodiments by applying an extension preload on the actuation member via one or more relatively flexible (relative to the axial stiffness of the actuation member) compression springs in combination with a relatively rigid tensioning member (i.e., a member that is rigid relative to the compression springs). FIGS. 3-5, for example, illustrate a strut 50 consistent with some embodiments of the invention. Strut 50 includes an actuation member 52 formed as a flexible braided metal cable preloaded with a quasi-static axial tensioning force and secured at opposing first and second ends to a pair of strut mounts 54, 56. Actuation member 52 extends through a rigid tensioning member 58 disposed between a pair of compression springs 60, 62. In addition, in this embodiment, a pair of spring retainers 64, 66 are interposed between rigid tensioning member 58 and compression springs 60, 62. Both the spring retainers 64, 66 and the strut mounts 54, 56 desirably include mating surfaces (e.g., mating surfaces 68, 70 seen in FIG. 4) to engage opposing faces of compression springs 60, 62 (e.g., opposing faces 72, 74 seen in FIG. 4) to spread the load over the opposing faces of each compression spring.

It will be appreciated that while actuation member 52 extends through both rigid tensioning member 58 and both compression springs 60, 62 in the configuration illustrated in FIGS. 3-5, the invention is not so limited, and in other embodiments an actuation member may extend external and/or adjacent to a rigid tensioning member and/or compression spring. So long as a portion of the actuation member that is flexible in bending or compression extends generally in parallel with a compression spring (i.e., such that tensioning of the actuation member preloads or compresses the compression spring) bending flexibility is generally achieved while maintaining axial rigidity in response to axial compressive forces below the quasi-static tensioning force.

To apply the extension preload to actuation member 52, each end of actuation member 52 is threaded (e.g., threads 76 seen in FIGS. 4-5) and threadably engages a fastener (e.g., fastener 78 seen in FIGS. 4-5). Each fastener may be a threaded fastener such as a nut, although other fasteners may be used in other embodiments, e.g., set screws, clamps, swage fittings, tapered collet clamps, crimp fasteners and other removable or permanently mounted fasteners that will be appreciated by those of ordinary skill having the benefit of the instant disclosure, as well as combinations of any of the aforementioned fasteners. In addition, in some embodiments, each strut mount 54, 56 may be internally threaded to engage with the threads 76 at each end of actuation member 52, thereby eliminating the use of separate fasteners. In this embodiment, each strut mount 54, 56 includes an axial channel through which actuation member 52 projects, e.g., axial channel 80 of FIGS. 4-5. For strut mount 54, axial channel 80 may include first and second portions 82, 84 defining a shoulder 86 against which fastener 78 engages to apply the extension preload, with first portion 82 having a diameter smaller than that of fastener 78 and second portion 84 having a diameter larger than that of fastener 78 to enable the fastener to be recessed within the strut mount. Similar axial channels 88, 90 and 92 are also provided in compression spring 60, spring retainer 64 and rigid tensioning member 58 to effectively enclose actuation member 52, although enclosing an actuation member is not required in many embodiments.

While not shown, a similar configuration to that illustrated in FIGS. 4-5 may be used to secure actuation member to strut mount 56. As such, when fastener 78 is threaded onto threads 76 of actuation member 52, and another fastener is threaded onto threads disposed at the opposite end of actuation member 52 projecting through strut mount 56, a tensioning force is applied through strut mount 54, compression spring 60, spring retainer 64, rigid tensioning member 58, spring retainer 66, compression spring 62 and strut mount 56.

In the illustrated embodiment, each of strut mounts 54, 56, spring retainers 64, 66 and rigid tensioning member 58 is formed of a structurally rigid material. In one example embodiment, for instance, strut mounts 54, 56 and spring retainers 64, 66 may be machined from aluminum or formed from another metal, while rigid tensioning member 58 may be formed from a high modulus carbon fiber tube to reduce the overall weight of the strut. It will be appreciated, however, that an innumerable number of different types of materials may be used for the aforementioned components, so the invention is not limited to the particular materials described herein.

In addition, compression springs 60, 62 are elastomer compression springs formed of solid urethane, rubber, or another suitable elastic material. It will be appreciated that because compression springs 60, 62 are flexible—both in compression and in bending—they generally do not add much bending stiffness to the strut ends over and above the bending stiffness of actuation member 52. Moreover, because the compression springs are flexible they are compressed a relatively large amount (i.e., a large axial displacement relative to any change in the stretch of the actuation member that will occur). As such, any slight extension of the actuation member due to give or creep or due to wear, fretting or deformation of a spring retainer, fastener threads, fastener surfaces, shoulders or other components that may occur over the life of the strut will generally be insignificant relative to the preload compression of the compression springs, and will generally not affect the extension preload in a meaningful way.

In addition, it will be appreciated that a dynamic load that is applied through the strut to actuate an object will generally cause equal deflection of the actuation member and the compression springs, but because the compression springs are generally significantly more flexible, this will result in almost no change in the compressive load through the compression springs and rigid tensioning member. This means that the preloading arrangement used in the strut will generally not be subject to meaningful dynamic load—it will be essentially a static load. This arrangement is generally beneficial for reliability because dynamic (oscillating) loads are generally much more damaging to mechanical systems (fatigue, fretting, and other wear and damage mechanisms) than static loads.

As such, strut 50 has relatively high axial stiffness, has end connections that have relatively low bending stiffness and bending stress, and lacks any non-elastic joints in the dynamic load path that could otherwise wear and cause slop or looseness. In one specific implementation of strut 50, an overall length of about 9 inches is provided, with an actuation member implemented using a flexible non-twist braided cable having a 0.25 inch diameter and an axial stiffness of approximately 73,550 lb/in. Threaded ends are fastened via a soldering process to eliminate unnecessary added diameter and length associated with swaged end fittings. A high modulus carbon fiber tube with an outer diameter of 0.605 in, inner diameter of 0.5 in, modulus of $33.6e^6$ psi, and weight of about 0.005 lbm/in is used as the rigid tensioning member, polyurethane die springs with outer diameters of 1 in, inner diameters of 0.5 in, and individual spring rates of between about 3500 lb/in and about 7000 lb/in (thus between about 1750 lb/in and about 3500 lb/in with two in series) are used for the compression springs, and the spring retainers and strut mounts are machined from aluminum. The strut so configured provides a bending stiffness of about 10 lbf to displace the end to about 0.5 in. For a dynamic load of +/−500 lbf, an about 600 lbf nominal static tension preload may be applied to the cable by tightening end retaining nuts, which compresses the polyurethane die spring at each end of the strut.

Figure 6:
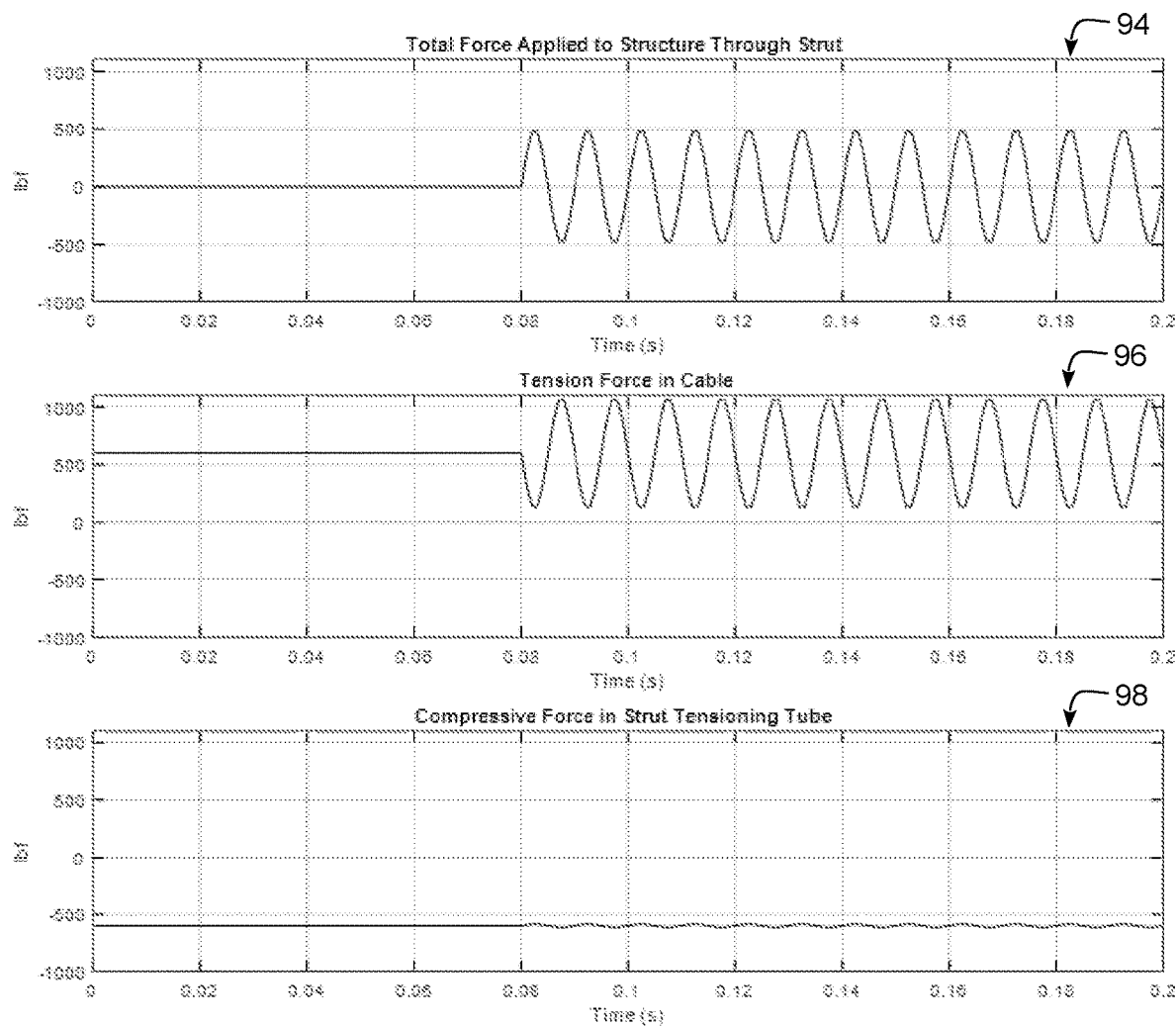
FIG. 6 includes several graphs illustrating the performance of an example implementation of the preloaded strut of FIG. 3.

FIG. 6 shows a total force applied via the strut to the structure (graph 94), a resulting tension force in the cable (graph 96), and a compressive force in the rigid tensioning member (graph 98) for a static case (0 to 0.08 seconds) and for a case with a 500 lbf, 100 Hz dynamic force applied by a linear actuator (>0.08 seconds). Note that the compressive force in the rigid tensioning member is essentially static (changes were about +/−11 lbs, or 1.8% of the static load in this example) and is generally unaffected by the dynamic variation of the tension force in the cable. This is because the stiffness of the axially flexible compression springs is far less than the cable stiffness. A small axial deflection of the strut causes a large change in the force in the stiff tension cable but only a small change in the force in the flexible compression spring/rigid tensioning member/connection assembly.

It should be appreciated therefore that the dynamic load path through strut 50 is through actuation member 52, and not through rigid tensioning member 58 and compression springs 60, 62. The application of a compressive force to the strut merely reduces the tensile load in the actuation member, and the compressive load in the rigid tensioning member and compression springs does not change meaningfully. As a result, the interfaces between components in the rigid tensioning member load path experience very little axial dynamic load. There will generally be some dynamic load due to cross-axis motion, however any wear will generally not cause "slop" as the interfaces are under constant compressive load.

Moreover, in the event that actuation member 52 relaxes over time, the strut will generally "absorb" this relaxation, and will be taken up by expansion of the elastic elements with minimal impact on performance. This happens because the compression springs must compress far more than the actuation member to generate the required tension preload. As a result, wear will generally manifest itself as a small relaxation of the compression springs, which will only reduce the tension preload by a relatively small amount.

Figure 7:
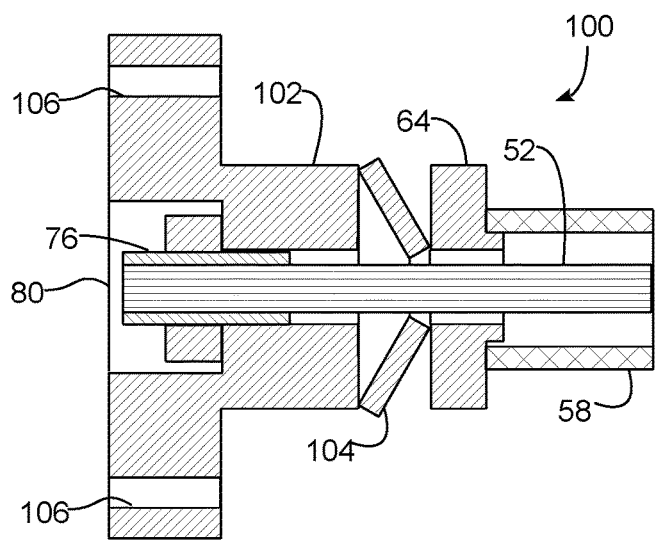
FIG. 7 is a cross-sectional view of one end of another preloaded strut consistent with some embodiments of the invention.
Figure 8:
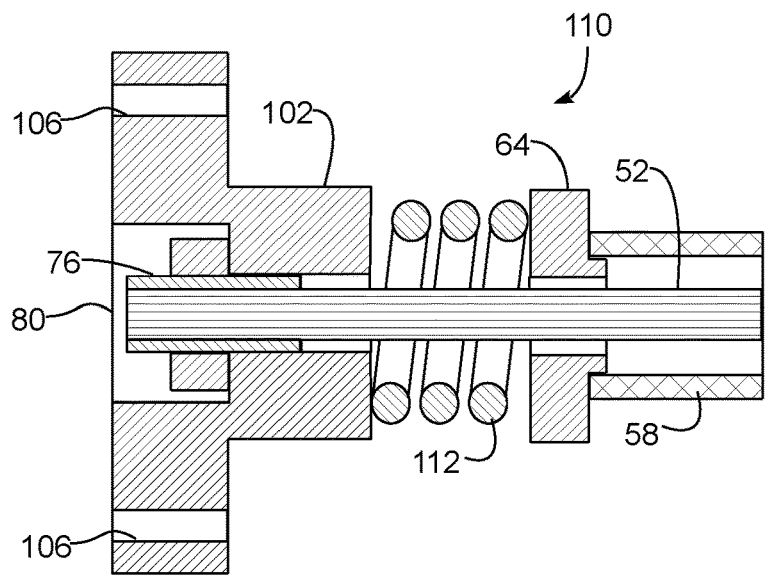
FIG. 8 is a cross-sectional view of one end of yet another preloaded strut consistent with some embodiments of the invention.

A number of variations may be implemented in other embodiments of a preloaded strut consistent with the invention. For example, as illustrated by strut 100 of FIG. 7 and strut 110 of FIG. 8, different types of compression springs may be used in other embodiments. Strut 100, for example, utilizes a Belleville or conical spring washer 104 in lieu of an elastomeric spring, while strut 110 utilizes a coiled compression spring 112. Springs 104, 112 may be formed of metal in some embodiments, or may be formed of other suitable materials in other embodiments. Moreover, other types of compression springs may be used in other embodiments, e.g., multi-stage Belleville washers with pivot pins, bellows (which may additionally be filled with rubber, grease, or another generally incompressible substance), air bags, fluid filled air bag type springs, flexure springs, etc.

In addition, as illustrated by strut mount 102 used in both strut 100 and strut 110, it may be desirable in some embodiments to provide one or more apertures 106 in a strut mount to support mounting the strut to another component (e.g., a linear actuator armature, a motion platform, a base, etc.). Various fasteners, e.g., screws, bolts, rivets, etc. may be used to secure strut mount 102 through apertures 106, and it will be appreciated that different numbers and sizes of apertures may be used in other embodiments. Moreover, to support other applications, a strut mount may be designed in an innumerable number of ways to accommodate the particular components to which a strut may be mounted, so the invention is not limited to the particular strut mounts illustrated herein.

As noted above, in the implementations discussed above, an actuation member is formed of a flexible braided metal cable that extends fully between opposing strut mounts, with each end of the cable threaded to engage with a corresponding nut to apply the tension preload to the cable, and thus, to the strut. In this regard, each nut functions as a tensioner for applying the tension preload. In other embodiments, however, different tensioners and tensioning arrangements may be used to apply a tension preload to an actuation member.

Figure 9:
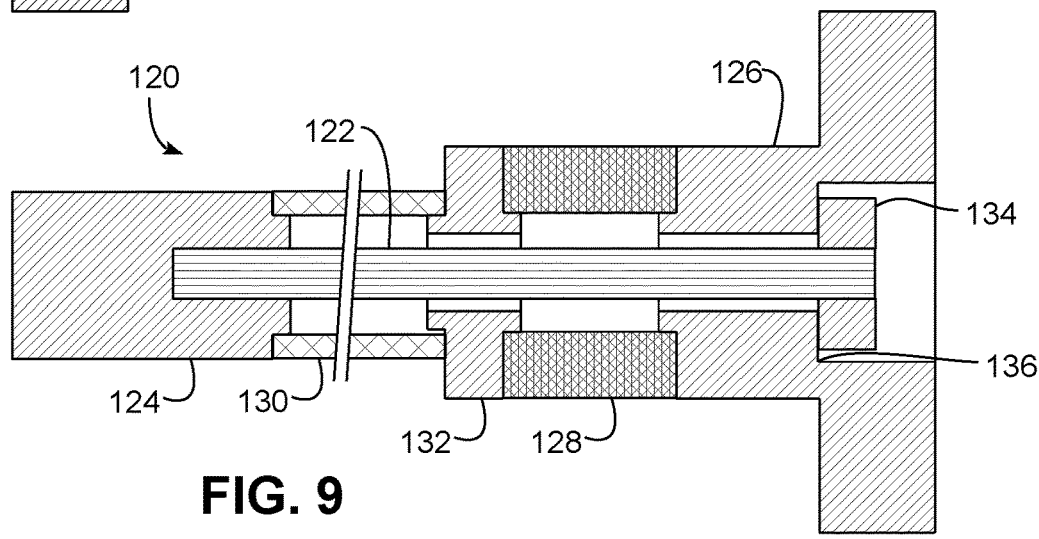
FIG. 9 is a cross-sectional view of one end of another preloaded strut consistent with some embodiments of the invention.

For example, in some embodiments, only one end of an actuation member may be tensioned with a tensioner, with the opposing end mounted to or retained by a strut mount in a fixed or nonadjustable configuration. FIG. 9, for example, illustrates a portion of a strut 120 having an actuation member including a flexible braided metal cable 122, a strut mount 126, compression spring 128, rigid tensioning member 130 and spring retainer 132 similar in configuration to the comparable components in strut 50 of FIGS. 3-5. However, rather than having a threaded end for engaging a nut or other fastener, flexible braided metal cable 122 is permanently mounted to a circular flange 134, e.g., via soldering, welding, clamping, etc., or is terminated with some form of material (e.g., a button head, conical element, wedge, etc.) that is larger in diameter than the aperture through which the cable projects (e.g., the first portion 82 of channel 80 of FIG. 5), etc., which in turn engages with shoulder 136 to retain cable 122 within strut mount 126 when under tension. In other embodiments, cable 122 may be permanently mounted or otherwise secured to strut mount 126, and in still other embodiments, cam lobes may be used to restrict withdrawal of an actuation member once inserted through an aperture.

In addition, in some embodiments both ends of an actuation member may be nonadjustable. For example, in some embodiments a tension preload may be applied to an actuation member during manufacture and prior to securing one or both ends of the actuation member, with the securement of the end(s) of the actuation member being performed under tension such that, upon securement and release, the tension preload is maintained. In some embodiments, for example, an actuation member may be heated during manufacture, secured at one or both ends, and then cooled such that the tension preload is applied as the actuation member contracts. In other embodiments, a wedge may be inserted after an actuation member is secured at one or both ends to apply the tension preload.

It will also be appreciated that a tension preload may be applied during manufacture of a strut, or in some embodiments, during installation of a strut in the field, e.g., after mounting the strut to surrounding components. Furthermore, a variable tension preload may be applied for different applications of a given strut design, thereby customizing a strut for a particular application. So long as the tension preload is greater than the maximum axial compressive force generated during use in a particular application, the actuation member, and thus the strut, will be axially stiff in response to the force, and application of an axial compressive force will not de-tension the actuation member.

It will also be appreciated that an actuation member need not be flexible in bending or compression along its entire length. FIG. 9, for example, illustrates a strut 120 including an actuation member having both flexible and rigid portions, with the flexible portion being implemented by flexible braided metal cable 122 and the rigid portion being implemented by a metal rod 124. Given that cable 122 is flexible in bending or compression, the strut is still bendable proximate compression spring 128.

It will also be appreciated that a strut consistent with the invention need not be bendable at both ends. For example, metal rod 124 may be fixedly mounted to a strut mount or other surrounding component in some implementations such that the only bending point along the length of strut 120 is proximate compression spring 128.

Figure 10:
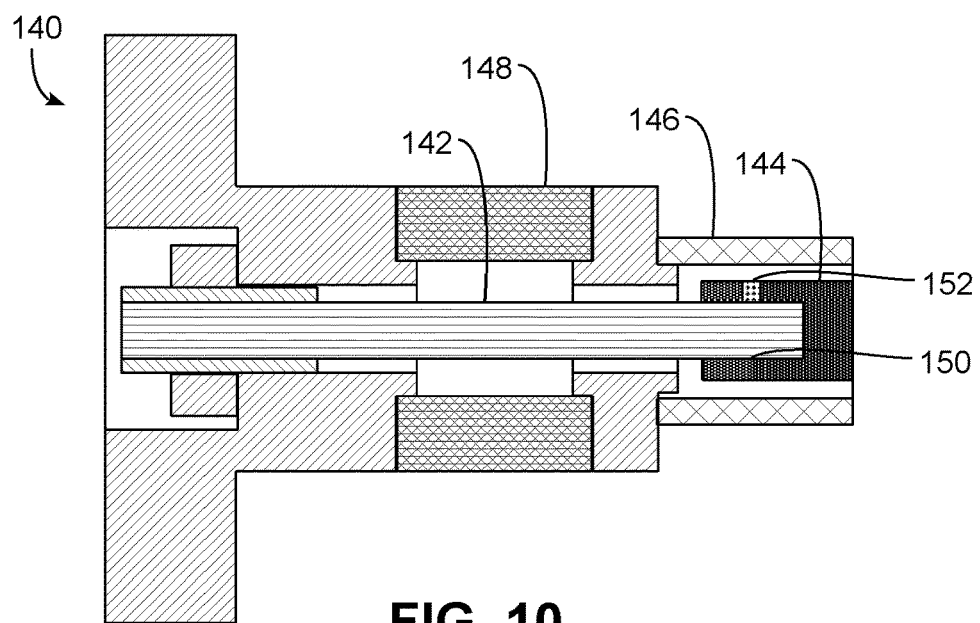
FIG. 10 is a cross-sectional view of one end of yet another preloaded strut consistent with some embodiments of the invention.

In addition, similar to strut 120 of FIG. 9, strut 140 of FIG. 10 illustrates an actuation member having both flexible and rigid portions, with the flexible portion being implemented by a bundle of metal wires 142 and the rigid portion being implemented by a solid metal rod 144. Solid metal rod 144 extends substantially through rigid tensioning member 146, but given cable 142 is flexible in bending or compression, the strut is still bendable proximate compression spring 148 due to the fact that cable 142 extends from one side of compression spring 148 to the other. Cable 142 may be attached to rod 144 in a number of manners, e.g., by machining a main channel 150 in the end of rod 144 to receive cable 142, machining a smaller transverse channel 152 in a side of rod 144, and introducing molten solder into transverse channel 152 to cause the solder to wick into the main channel 150.

Figure 11:
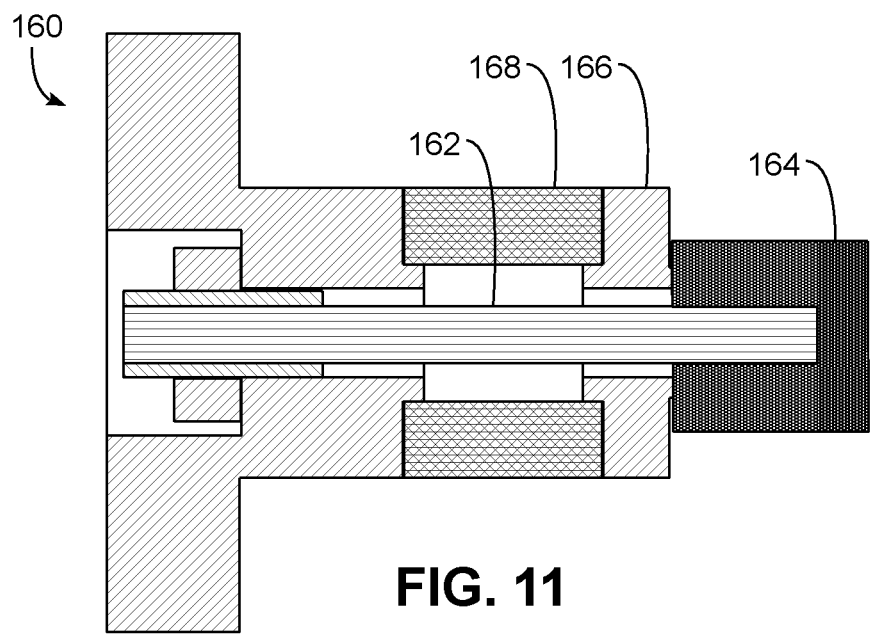
FIG. 11 is a cross-sectional view of one end of yet another preloaded strut consistent with some embodiments of the invention.

In still other embodiments, a rigid tensioning member may function as the rigid portion of an actuation member. FIG. 11, for example, illustrates a strut 160 including an actuation member having both flexible and rigid portions, with the flexible portion being implemented by a bundle of metal wires 162 and the rigid portion being implemented by a solid metal rod 164. Rather than extending through a separate rigid tensioning member, however, rod 164 abuts a spring retainer 166 to place cable 162 in tension, but given cable 162 is flexible in bending or compression, the strut is still bendable proximate a compression spring 168. As such, rod 164 serves as both a rigid portion of an actuation member and a rigid tensioning member.

Figure 12:
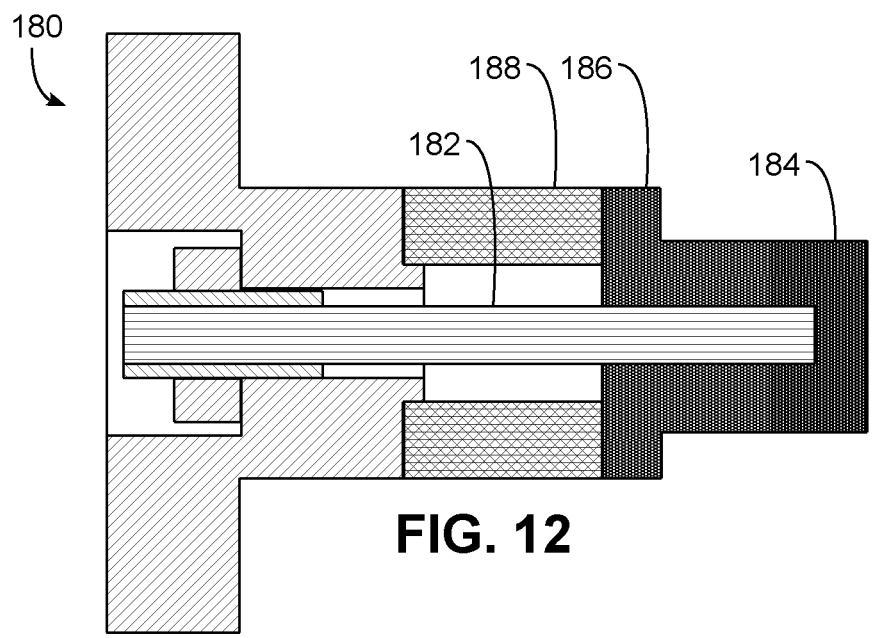
FIG. 12 is a cross-sectional view of one end of yet another preloaded strut consistent with some embodiments of the invention.

Further, as illustrated by strut 180 of FIG. 12, in some embodiments a rigid tensioning member may also function as a spring retainer, thereby avoiding the need for a separate spring retainer. Strut 180, in particular, includes an actuation member having both flexible and rigid portions, with the flexible portion being implemented by a bundle of metal wires 182 and the rigid portion being implemented by a solid metal rod 184. Rather than extending through a rigid tensioning member and abutting a spring retainer to place cable 182 in tension, rod 184 has an enlarged flange 186 that forms a contact surface for a compression spring 188 such that rod 184 serves as a rigid portion of an actuation member, a rigid tensioning member, and a spring retainer.

Returning now to FIG. 1, it will be appreciated that the various strut designs discussed above may be utilized within any of the supports coupling motion platform 12 to base 14. In addition, in some embodiments, one or more struts as discussed herein may be used to anchor the motion platform to the base to restrict motion of the motion platform in at least one degree of freedom, e.g., as a slip plate for calibration purposes, or to restrict the platform to translation without rotation, or vice versa. The aforementioned struts may also be used in other parallel manipulator designs, or in other applications, as discussed above.

Other variations and embodiments will be apparent to those skilled in the art from consideration of the specification and practice of the present invention. Therefore the invention lies in the claims set forth hereinafter.

What is claimed is:

1. A strut including first and second opposing ends, the strut comprising:
a rigid tensioning member;
a compression spring interposed between the first end of the strut and a first end of the rigid tensioning member; and
an actuation member extending through the rigid tensioning member and the compression spring, the actuation member being substantially axially rigid under tension and at least a portion of the actuation member extending through the compression spring being substantially flexible in bending or compression, wherein the actuation member is preloaded through the compression spring and the rigid tensioning member with a quasi-static axial tensioning force such that the actuation member remains substantially axially rigid in response to application of an axial compressive force to the strut that is less than the quasi-static tensioning force.

2. The strut of claim 1, further comprising a tensioner coupled to a first end of the actuation member proximate the compression spring to apply the quasi-static tensioning force to the actuation member.

3. The strut of claim 2, wherein the first end of the actuation member is threaded, and wherein the tensioner comprises a nut that is threadably engaged with the first end of the actuation member.

4. The strut of claim 1, wherein the rigid tensioning member comprises a rigid tensioning tube.

5. The strut of claim 4, wherein the rigid tensioning tube comprises a carbon fiber tube.

6. The strut of claim 1, wherein the compression spring comprises an elastomeric spring.

7. The strut of claim 1, wherein the compression spring comprises a coiled spring.

8. The strut of claim 1, wherein the compression spring comprises a conical spring washer.

9. The strut of claim 1, wherein the actuation member comprises a braided metal cable comprised of a plurality of strands.

10. The strut of claim 1, wherein the portion of the actuation member comprises a first portion of the actuation member that is flexible in bending or compression, and wherein the actuation member further comprises a second, rigid portion that is less flexible than the first portion of the actuation member.

11. The strut of claim 1, further comprising a strut mount disposed proximate the first end of the strut and configured to mount the strut to an external member, wherein the actuation member is secured to the strut mount with the compression spring substantially interposed between the strut mount and the rigid tensioning member.

12. The strut of claim 11, wherein the strut mount includes an axial channel, and wherein the actuation member projects through the axial channel of the strut mount.

13. The strut of claim 1, wherein the actuation member is preloaded during manufacture.

14. The strut of claim 1, wherein the actuation member is preloaded during installation.

15. A strut including first and second opposing ends, the strut comprising:
a rigid tensioning member;
a first and second compression springs, the first compression spring interposed between the first end of the strut and the first end of the rigid tensioning member and the second compression spring interposed between the second end of the strut and the second end of the rigid tensioning member; and
an actuation member extending through the rigid tensioning member and the first and second compression springs, the actuation member being substantially axially rigid under tension and at least first and second portions of the actuation member extending respectively through the first and second compression springs being substantially flexible in bending or compression, wherein the actuation member is preloaded through the first and second compression springs and the rigid tensioning member with a quasi-static axial tensioning force such that the actuation member remains substantially axially rigid in response to application of an axial compressive force to the strut that is less than the quasi-static tensioning force.

16. A strut, comprising:
a strut mount;
a rigid tensioning tube having a first end;
a compression spring interposed between the strut mount and the first end of the rigid tensioning tube;
a flexible braided metal cable having a threaded end and extending through the rigid tensioning tube and through each of the compression spring and the strut mount; and
a fastener secured to the threaded end of the flexible braided metal cable and tensioned to apply a quasi-static tensioning force to the flexible braided metal cable through the rigid tensioning tube, the compression spring and the strut mount such that the flexible braided metal cable remains substantially axially rigid in response to application of an axial compressive force to the strut that is less than the quasi-static tensioning force.

17. A strut, comprising:
first and second strut mounts;
a rigid tensioning tube disposed intermediate the first and second strut mounts and having first and second ends respectively disposed proximate the first and second strut mounts;
first and second compression springs, the first compression spring interposed between the first strut mount and the first end of the rigid tensioning tube and the second compression spring interposed between the second strut mount and the second end of the rigid tensioning tube;
a flexible braided metal cable having first and second threaded ends and extending through the rigid tensioning tube and through each of the first and second compression springs and the first and second strut mounts; and
first and second fasteners respectively secured to the first and second threaded ends of the flexible braided metal cable and tensioned to apply a quasi-static tensioning force to the flexible braided metal cable through the rigid tensioning tube, the first and second compression springs and the first and second strut mounts such that the flexible braided metal cable remains substantially axially rigid in response to application of an axial compressive force to the strut that is less than the quasi-static tensioning force.

18. A parallel manipulator, comprising:
a base;
a platform; and
a plurality of platform supports supporting the platform on the base for movement of the platform with multiple degrees of freedom, a first platform support of the plurality of platform supports including a first linear actuator and a first strut coupling the platform to the base, the first strut comprising:
a rigid tensioning member;
a compression spring disposed proximate a first end of the rigid tensioning member; and
an actuation member extending through the rigid tensioning member and the compression spring, the actuation member being substantially axially rigid under tension and at least a portion of the actuation member extending through the compression spring being substantially flexible in bending or compression, wherein the actuation member is preloaded through the compression spring and the rigid tensioning member with a quasi-static axial tensioning force such that the actuation member remains substantially axially rigid in response to application of an axial compressive force to the strut that is less than the quasi-static tensioning force.

19. The parallel manipulator of claim 18, wherein the rigid tensioning member is a first rigid tensioning member, the compression spring is a first compression spring, the actuation member is a second actuation member, the quasi-static axial tensioning force is a first quasi-static axial tensioning force, and the axial compressive force is a first axial compressive force, and wherein the plurality of platform supports further includes a second platform support, the second platform support including a second linear actuator and a second strut coupling the platform to the base, the second strut comprising:
a second rigid tensioning member;
a second compression spring disposed proximate a first end of the second rigid tensioning member; and
a second actuation member extending through the second rigid tensioning member and the second compression spring, the second actuation member being substantially axially rigid under tension and at least a portion of the second actuation member extending through the second compression spring being substantially flexible in bending or compression, wherein the second actuation member is preloaded through the second compression spring and the second rigid tensioning member with a second quasi-static axial tensioning force such that the second actuation member remains substantially axially rigid in response to application of a second axial compressive force to the second strut that is less than the second quasi-static tensioning force.

20. A parallel manipulator, comprising:
a base;
a platform;
a plurality of platform supports supporting the platform on the base for movement of the platform with multiple degrees of freedom, each of the plurality of platform supports including a linear actuator; and
one or more struts anchoring the platform to the base to restrict motion of the platform in at least one degree of freedom, each strut comprising:
a rigid tensioning member;
a compression spring disposed proximate a first end of the rigid tensioning member; and
an actuation member extending through the rigid tensioning member and the compression spring, the actuation member being substantially axially rigid under tension and at least a portion of the actuation member extending through the compression spring being substantially flexible in bending or compression, wherein the actuation member is preloaded through the compression spring and the rigid tensioning member with a quasi-static axial tensioning force such that the actuation member remains substantially axially rigid in response to application of an axial compressive force to the strut that is less than the quasi-static tensioning force.

21. A strut, comprising:
a strut mount;

a rigid tensioning member;

a compression spring disposed intermediate the strut mount and the rigid tensioning member; and an actuation member extending in parallel with the compression spring between the strut mount and the rigid tensioning member, the actuation member being substantially axially rigid under tension and at least a portion of the actuation member that extends between the strut mount and the rigid tensioning member being substantially flexible in bending or compression, wherein the actuation member is preloaded across the compression spring and between the strut mount and the rigid tensioning member with a quasi-static axial tensioning force such that the actuation member remains substantially axially rigid in response to application of an axial compressive force to the strut that is less than the quasi-static tensioning force.

22. The strut of claim 21, wherein the rigid tensioning member is a rigid portion of the actuation member.

23. The strut of claim 22, wherein the rigid tensioning member further includes a mating surface that mates with a complementary mating surface of the compression spring.

24. The strut of claim 21, wherein at least a portion of the actuation member extends through the rigid tensioning member.

25. The strut of claim 21, wherein at least a portion of the actuation member extends through the compression spring.

26. A strut, comprising:

a strut mount;

an actuation member including flexible and rigid portions; and a compression spring disposed intermediate the strut mount and the rigid portion of the actuation member;

wherein the flexible portion of the actuation member extends between the rigid portion of the actuation member and the strut mount;

wherein the flexible portion is substantially axially rigid under tension and substantially flexible in bending or compression; and wherein the flexible portion of the actuation member is preloaded through the compression spring with a quasi-static axial tensioning force such that the flexible portion of the actuation member remains substantially axially rigid in response to application of an axial compressive force to the strut that is less than the quasi-static tensioning force.

* * * * *